July 26, 1932.  G. H. RUFLE  1,868,993
SYNCHRONIZING METHOD AND APPARATUS FOR MAKING SOUND PICTURE FILMS
Filed Jan. 3, 1930    2 Sheets-Sheet 1
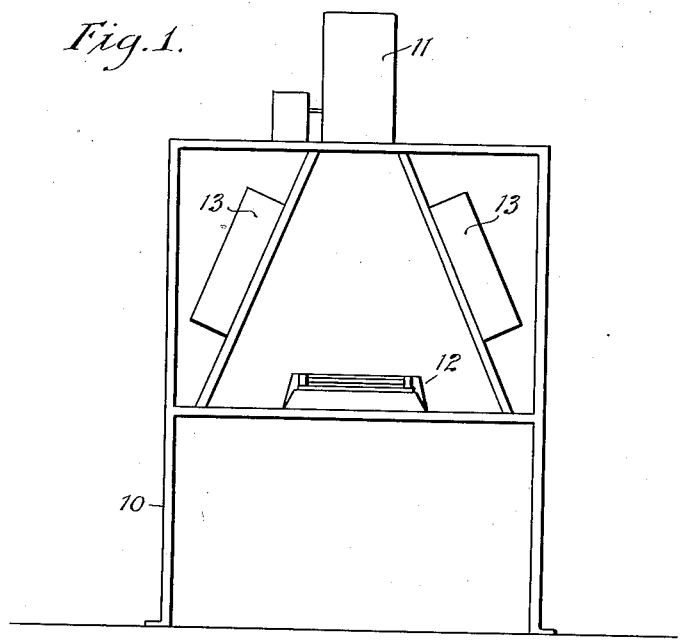
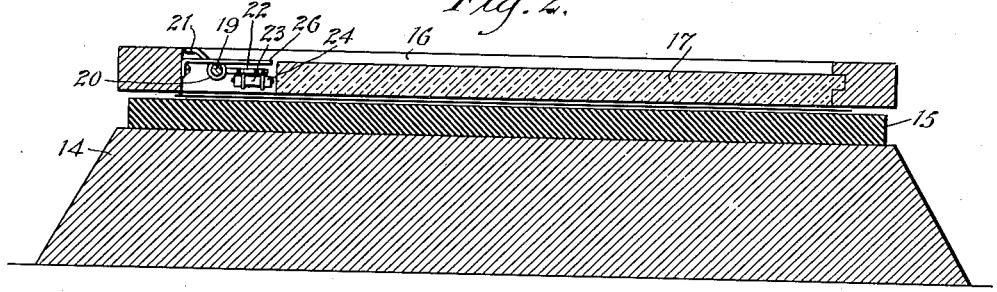
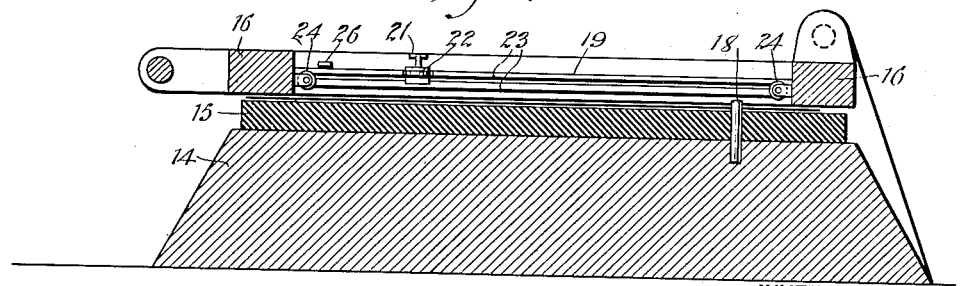
WITNESSES
Edw. Thorpe
Chris Feinle
INVENTOR
George H. Rufle
BY Munn & Co.
ATTORNEY July 26, 1932.  G. H. RUFLE  1,868,993
SYNCHRONIZING METHOD AND APPARATUS FOR MAKING SOUND PICTURE FILMS
Filed Jan. 3, 1930  2 Sheets-Sheet 2

WITNESSES
Edw. Thorpe
Chris Feinle

INVENTOR
George H. Rufle
BY Munn & Co.
ATTORNEY

Patented July 26, 1932

1,868,993

UNITED STATES PATENT OFFICE

GEORGE H. RUFLE, OF ASTORIA, NEW YORK

SYNCHRONIZING METHOD AND APPARATUS FOR MAKING SOUND-PICTURE FILMS

Application filed January 3, 1930. Serial No. 418,291.

This invention relates to the art of making sound-picture films, and more particularly relates to a method and apparatus for synchronizing sound and pictures of cartoons and/or objects in making a sound-animated picture film.

The invention contemplates a novel method whereby the director, in charge of persons who produce the sound effects or music, may be guided in directing his charges, so as to obtain the desired sound effects in timed accord with the picture effects or progressive actions in the finished film.

The invention also contemplates a method of the indicated character which in practice will make it possible for a sound director to view both animations and a time indicator which simulates the action of a baton at the same time, clearly, without being confused while directing his charges.

The invention also contemplates a novel apparatus for carrying out important steps in the method hereinafter described.

The method and apparatus will be best understood from a consideration of the following description taken in conjunction with the accompanying drawings, with the further understanding that the drawings illustrate the apparatus by way of example only and that the phase of invention as embodied in the apparatus is not limited to any strict conformity with the showing in the drawings, but that other embodiments falling within the scope of the appended claims may be adopted.

In the drawings:

Figure 1 is a side view of a photographing apparatus involved in the present invention, the same being conventionally shown;

Figure 2 is an enlarged section of the framing or registering device and time indicator;

Figure 3 is a section taken on the line 3—3 of Figure 4;

Figure 4:
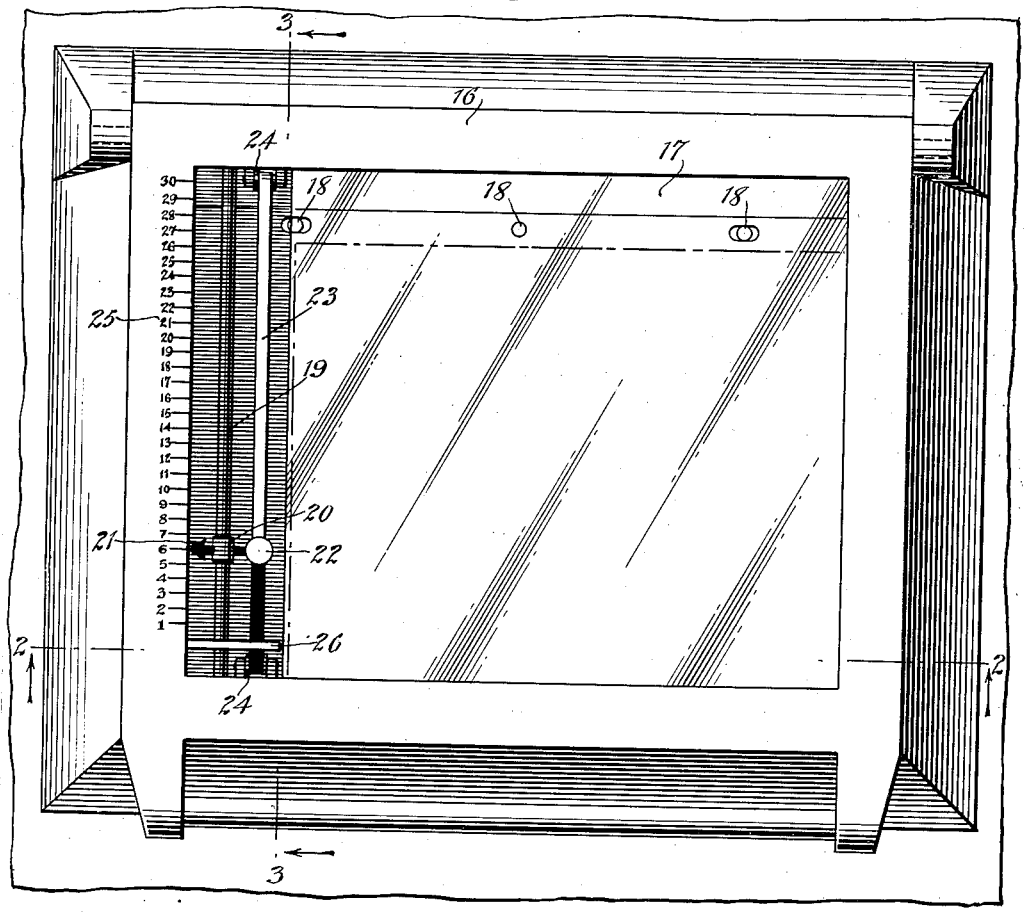
Figure 4 is a plan view of the framing or registering device and time indicator.

The invention involves the use of a photographing apparatus as shown in Figure 1, which comprises a stand 10, a motor operated camera 11 positioned on the stand 10 with its lens pointing down, a framing or registering device 12 on the stand 10 below the camera 11, and lamps 13 positioned on the stand with respect to the device 12, which furnish the necessary illumination. The device 12 comprises a base 14 on which is positioned a flat soft rubber pad 15, a frame 16 having a glass panel 17 attached to the base 14 to swing up and down with respect to the pad 15, and registering pins or pegs 18 on said base extending upwardly through the pad 15. The backgrounds and animated drawings in their proper order are successively arranged on the pins or pegs 18, held in place between the pad 15 and panel 17, and are photographed, making successive pictures of them on a strip of film in the camera, by actuating the camera motor switch once for each scene or assembly. This apparatus and its functions and the procedure just described are well known in the art of making animated cartoon films.

In order to allocate a sound track on a film strip, the picture frames necessarily occupy an isolated area extending along the film strip, leaving a relatively narrow isolated area for the sound track extending along the film strip at one side of said picture frames.

In accordance with the present invention a time indicator is associated with the framing or registering device 12. In the present instance the time indicator comprises a rod 19, a slide 20 having a pointer 21 and a disk 22, an endless tape 23 which travels around on spools 24, and a scale 25. The rod 19 is carried by the frame 16. The slide 22 has guided movement on the rod 19. The spools 24 are carried by the frame 16. The disk 22 is attached to the tape 23. Approximately one half of the tape is white and the other half is dyed black, and said disk 22 is also white. The rod 19 and slide 22 and the pointer 21 of the latter are painted black. The disk 22 and tape 23 are in the field of the camera lens, and it will be apparent that the indicator is located so as to be at one side of the drawings arranged on the pad 15. It will therefore be understood that as each scene or assembly is photographed, the disk 22 and the exposed white portion of the tape 23 will be photographed at the same time. With the pointer 21 and scale 25 as a guide the disk 22 is set at different positions or left to remain in certain positions. In each position the disk 22 together with the exposed white portion of the tape 23 will be photographed in the aforesaid narrow isolated area of the film strip adjacent each picture frame on each exposure of the film strip. If desired a white strip 26 carried by the frame 16 and extending crosswise over the black portion of the tape 23 may be photographed in each exposure. It should now be understood that the disk 22 and the white portion of the tape 23 when photographed in the manner explained will simulate a baton; and that the strip 26 will bear a fixed object in relation to which said indicator or baton moves.

Figure 5:
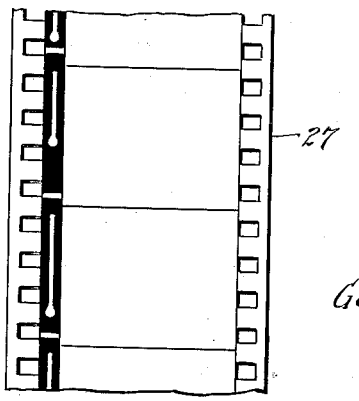
Figure 5 is a view of a portion of the film strip.

The finished film strip is used as a work film and a portion thereof is shown in Figure 5, and designated 27. This work film is used in the usual manner to project the pictures and time indicator simultaneously on a screen. The pictures and time indicator will be visible respectively on isolated areas of the screen. The time indicator in effect on the screen gives the proper tempo or timing, and beats to guide or give to a sound director his cues to direct his charges so that the proper sounds or music will be delivered at the proper time according to the progressive action portrayed by the pictures.

The method within the present invention consists in photographically registering a time indicator and animated cartoons or objects on a work film respectively along isolated areas thereof, and then using the work film in the usual manner to project the time indicator and the scenes presented by the cartoons or objects on a screen for observation by a sound or music director, for the purpose of obtaining synchronization of sound and pictures in the production of a sound-picture film strip.

It is to be understood that sound track appropriate to the series of pictures will be made on a separate film strip, and that the latter will be used to transfer the sound track to still another film to make a positive film having the combined pictures and sound track.

What is claimed is:

1. The combination with a cartoon registering and framing device, of a tempo indicating means adjustable on said device so as to be photographed together with a cartoon.

2. The combination with a cartoon registering and framing device, of a tempo indicating means positioned on said device, said means including an endless strip mounted for movement and having contrasting sections, and a slide connected with said strip and provided with a part disposed at a juncture of said contrasting sections of the strip.

3. The combination with a cartoon registering and framing device, of a tempo indicating means positioned on said device, said means including an endless strip mounted for movement and having contrasting sections, and a slide connected with said strip and provided with a part disposed at a juncture of said contrasting sections of the strip; and means to gauge the adjustments of said slide.

4. The combination with a cartoon registering and framing device, of a tempo indicating means adjustable on said device so as to be photographed together with a cartoon, and means to gauge the adjustment of said indicating means.

5. That improvement in a method of making synchronized sound and animated picture films, which consists in using a tempo indicator and a series of animations, singly arranging the animations in relation to the indicator, simultaneously photographically registering the indicator and each animation as arranged in relation to each other on a film, and then using the film in a projector in the usual manner to project the indicator and animations on the same screen to guide a director in synchronizing the sound and/or musical effects with regard to the animations.

6. The improvement in the method of making synchronized sound and animated picture films, which consists in using a tempo indicator and a series of animations, arranging the animations in relation to a predetermined sequence, photographically imprinting the animations on a predetermined area of a film in the predetermined sequence, singly arranging the indicator to indicate a desired sequence of tempo having a predetermined relation to the sequential arrangement of the animations, photographically imprinting the indicator on a predetermined area of the film subsequently to be occupied by the sound track whereby the animations and tempo indication appear in a predetermined relation on the film and then using the film in a projector to project the indicator and animations on the same screen to guide a director in synchronizing the sound and/or musical effects with regard to the animations.

Signed at 1600 Broadway, in the county of New York, and State of New York, this 31st day of December, 1929.

GEORGE H. RUFLE.